United States Patent [19]
Suzuki et al.

[11] Patent Number: 5,842,054
[45] Date of Patent: Nov. 24, 1998

[54] SHAKE DISCRIMINATION AND IMAGE STABILIZER

[75] Inventors: Koji Suzuki; Etsuro Saito, both of Kanagawa, Japan

[73] Assignee: Sony Corporation, Tokyo, Japan

[21] Appl. No.: 934,433

[22] Filed: Sep. 19, 1997

[30] Foreign Application Priority Data

Sep. 20, 1996 [JP] Japan .................................... 8-250724

[51] Int. Cl.$^6$ .................................................. G03B 17/00
[52] U.S. Cl. ............................................ 396/55; 348/208
[58] Field of Search ........................ 396/52–55; 398/208

[56] References Cited

U.S. PATENT DOCUMENTS

| | | | |
|---|---|---|---|
| 5,107,293 | 4/1992 | Sekine et al. .............................. | 396/55 |
| 5,282,044 | 1/1994 | Misawa et al. ....................... | 396/55 X |
| 5,331,365 | 7/1994 | Miyazawa et al. .................... | 396/52 X |
| 5,369,462 | 11/1994 | Miyazawa et al. .................... | 396/52 X |
| 5,376,993 | 12/1994 | Kubota et al. ......................... | 396/55 X |
| 5,619,030 | 4/1997 | Shiomi .................................. | 396/55 X |
| 5,655,157 | 8/1997 | Enomoto .................................. | 396/55 |

FOREIGN PATENT DOCUMENTS

| | | |
|---|---|---|
| 3-237411 | 10/1991 | Japan . |
| 3-248132 | 11/1991 | Japan . |
| 6-98246 | 4/1994 | Japan . |

*Primary Examiner*—W. B. Perkey
*Attorney, Agent, or Firm*—Frommer Lawrence & Haug, LLP; William S. Frommer

[57] ABSTRACT

A shake discriminator comprising a first shake detection means disposed in a camera system to shoot a subject and serving to detect a shake of the camera system; a second shake detection means disposed in the camera system and serving to detect a shake of a cameraman's face with regard to the camera system; and a shake discrimination means for making a discrimination, on the basis of the detection outputs of the first and second shake detection means, as to whether the shake of the camera system is the one intended by the cameraman. Due to such discrimination, it becomes possible to prevent an erroneous correction which may otherwise be executed when the shake of the camera system is the one intended by the cameraman.

8 Claims, 12 Drawing Sheets

F I G. 6
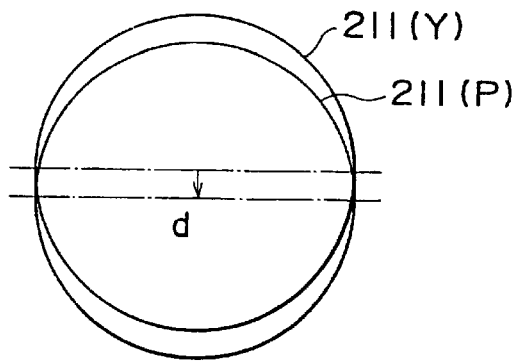
F I G. 7
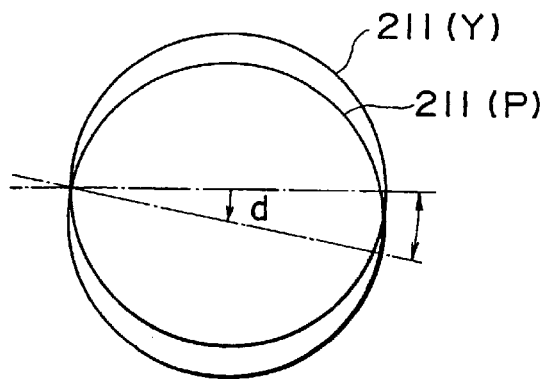
F I G. 8
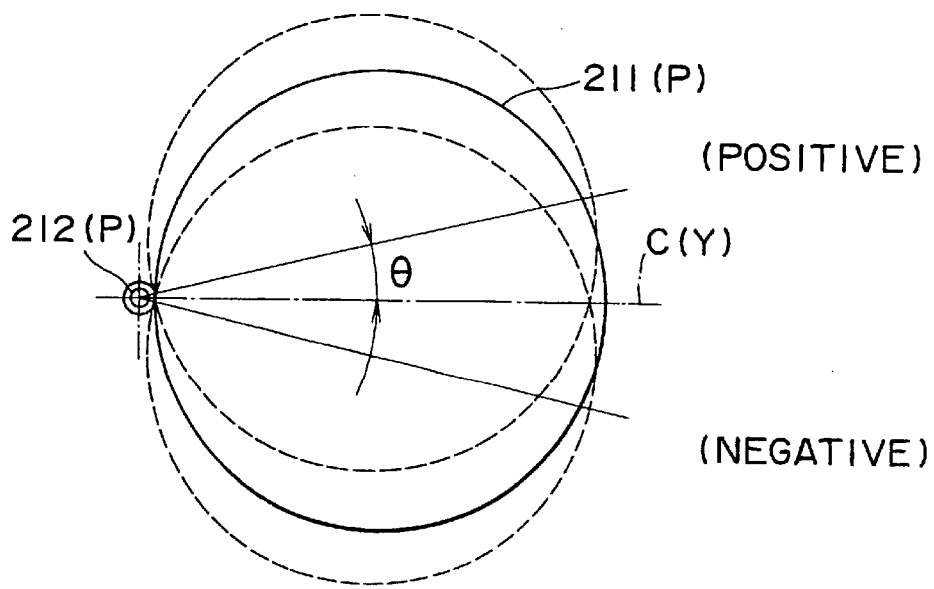

FIG. 14
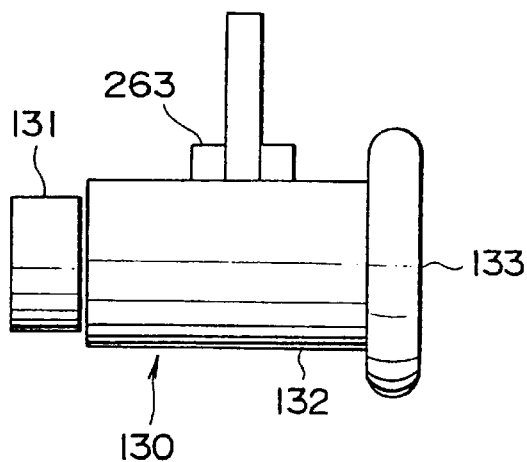
FIG. 15
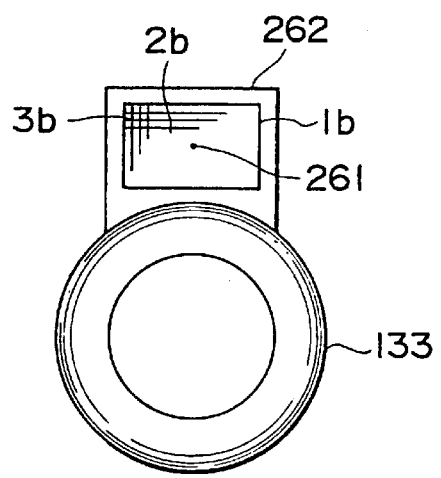
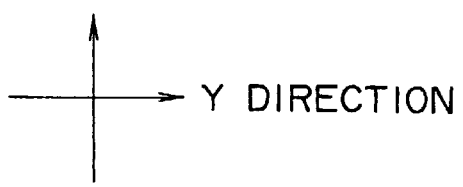

SHAKE DISCRIMINATION AND IMAGE STABILIZER

BACKGROUND OF THE INVENTION

1. Field of the Invention

The present invention relates to a image stabilizer adapted to be employed as a image stabilizing optical apparatus in a shooting camera system such as a camera-integrated video tape recorder (hereinafter referred to as "video camera"). The invention relates also to a shake discriminator which is a device for making a discrimination as to whether or not any shake of such a camera system is the one intended by a cameraman.

2. Description of the Related Art

Relative to video cameras for use in the broadcasting business, a demand has been arising recently to realize more simplified manipulation and enhanced functions. In accordance with such demand, there is currently noticed a requirement of a image stabilizer for a video camera as well. Here, a image stabilizer is a device for correcting a manual shake of a video camera. That is, this device serves to suppress any shake of a shot image caused by the manual shake of a video camera.

In this image stabilizer, it is necessary not to correct any other shake of the video camera caused by a manipulation such as panning or tilting. In other words, any shake intended by a cameraman need not be corrected. Ideally, it is requisite to correct only the unintended shake alone without correcting any shake intended by the cameraman. In comparison with an ordinary video camera for general users, this requisite is particularly important in a professional video camera for the broadcasting business where a highly technical camera manipulation is required. In the following description, it is supposed that unintended shakes by a cameraman include, in addition to manual shakes, those caused by vibrations or shocks during running of a car and so forth.

In order to correct merely any unintended shake without correcting the cameraman's intentional shake, it is necessary to achieve a function which makes a discrimination as to whether or not the shake of a video camera is the one intended by the cameraman.

For the purpose of realizing such a function, it has been customary heretofore, in an ordinary image stabilizer incorporated in a video camera for general users, to extract the feature of the output of a shake detector which detects the shake of the video camera, and then to make a discrimination, on the basis of the result of such extraction, as to whether the detected shake of the video camera is the cameraman's intentional one or not.

In the above structure, however, it is difficult to exactly separate the cameraman's intentional shake from any unintended one. Accordingly, in the known relational image stabilizer, there exists a problem that the cameraman's intentional shake is also corrected in error.

In dealing with the above problem, the relational image stabilizer was so devised as to suppress the shake correction amount (amplitude or frequency of shake) somewhat lower than its proper value, thereby preventing occurrence of any large erroneous correction.

However, even in such a structure, it has been impossible heretofore to completely prevent occurrence of a large erroneous correction to a certain degree depending on the motion characteristic of a video camera with panning or tilting manipulation.

Due to the disadvantage mentioned, there arises a problem in the relational image stabilizer that some incongruous feeling may be incidental to panning or tilting. Moreover, the cameraman's intention fails to be reflected exactly in a shot image, so that the image obtained may be rendered unsatisfactory for the cameraman. Further, since an operation for returning the shift of the shake correcting action to the former state is executed upon halt of the video camera, a return swing is caused in the shot image to consequently give some discomfort to the cameraman.

In an attempt to solve this problem, some of the known image stabilizers are equipped with a button to instruct a stop of the shake correcting action, wherein, when this button is manipulated, execution of the shake correcting action is inhibited. According to such a structure, none of erroneous shake correcting action is executed due to a manipulation of this button at the time of panning or tilting, whereby the above-described problem can be solved.

However, in this structure where some intricate manipulation is additionally required for the cameraman besides the essential manipulation of the camera, there also exists a problem that the cameraman is unable to concentrate on his job or activity in the field.

For the reason described above, it has been difficult heretofore to employ the known image stabilizer, which is used in an ordinary video camera for general consumers, in any professional video camera designed for the broadcasting business.

SUMMARY OF THE INVENTION

It is therefore an object of the present invention to provide a shake discriminator and a image stabilizer which are capable of exactly discriminating between a cameraman's intended shake and his unintended shake and automatically preventing occurrence of an erroneous correction without the necessity of any additional manipulation.

According to one aspect of the present invention, there is provided a shake discriminator which comprises a first shake detection means incorporated in a camera system to shoot a subject and serving to detect a shake of the camera system; a second shake detection means incorporated in the camera system and serving to detect a shake of a cameraman's face with regard to the camera system; and a shake discrimination means for making a discrimination, on the basis of the detection outputs of the first and second shake detection means, as to whether the shake of the camera system is the one intended by the cameraman.

According to another aspect of the present invention, there is provided a image stabilizer which comprises a first shake detection means incorporated in a camera system to shoot a subject and serving to detect a shake of the camera system; a second shake detection means incorporated in the camera system and serving to detect a shake of a cameraman's face with regard to the camera system; a shake discrimination means for making a discrimination, on the basis of the detection outputs of the first and second shake detection means, as to whether the shake of the camera system is the one intended by the cameraman; and a shake correction means for correcting the shake of the camera system in response to the output of the discrimination means signifying that the shake of the camera system is not the one intended by the cameraman, the shake correction means capable of holding the preceding corrected state when the output of the discrimination means signifies that the shake of said camera system is the intended one.

Thus, in the present invention, the shake of the camera system is detected by the first shake detection means.

Meanwhile the shake of the cameraman's face with regard to the camera system is detected by the second shake detection means. And on the basis of such two detection outputs, a discrimination is made by the shake discrimination means as to whether the shake of the camera system is the one intended by the cameraman.

Therefore, it becomes possible to prevent an erroneous correction which may otherwise be executed when the shake of the video camera for example is the one intended by the cameraman. Consequently, incongruous feeling in manipulation of the camera can be eliminated, and a satisfactory shot image is achievable with expression of the cameraman's intention. Further, since the amount of shake correction need not be suppressed to a lower value, it is possible to fully exert the essential characteristics of the image stabilizer, hence ensuring powerful and adequate shooting environment with shake correction. In addition, none of return swing is generated for returning the shift of any erroneous correcting action to the former state, so that the cameraman is given comfortable shooting environment with a complete function of shake correction. Besides, there exists no necessity of demanding the cameraman to perform any additional manipulation for avoiding erroneous correction, thereby enabling the cameraman to concentrate on his job or activity. Thus, according to the present invention, an improved image stabilizer can be provided for use in a video camera for broadcasting business.

Further according to the present invention, the operation for detecting a shake of the cameraman's face is so performed as to detect the relative shake of the cameraman's face to the shooting camera system instead of detecting the absolute shake of his face, so that a means for detecting the shake of the cameraman's face can be incorporated in the camera system. Consequently, it becomes possible to facilitate handling and so forth of the face shake detection means.

The above and other features and advantages of the present invention will become apparent from the following description which will be given with reference to the illustrative accompanying drawings.

BRIEF DESCRIPTION OF THE DRAWINGS

FIG. 6 is a schematic diagram for explaining an example of a lens shifting operation to change the angle of the transmission optical axis;

FIG. 7 is a schematic diagram for explaining a lens shifting operation performed in the first embodiment to change the angle of the transmission optical axis;

FIG. 8 is a schematic diagram showing a rotation locus of a plano-concave lens used in the first embodiment;

FIG. 14 is a side view showing the structure of principal components in a second embodiment of the present invention;

FIG. 15 is a front view showing the structure of principal components in the second embodiment;

DESCRIPTION OF THE PREFERRED EMBODIMENTS

Hereinafter some preferred embodiments of the present invention will be described in detail with reference to the accompanying drawings.

Figure 1:
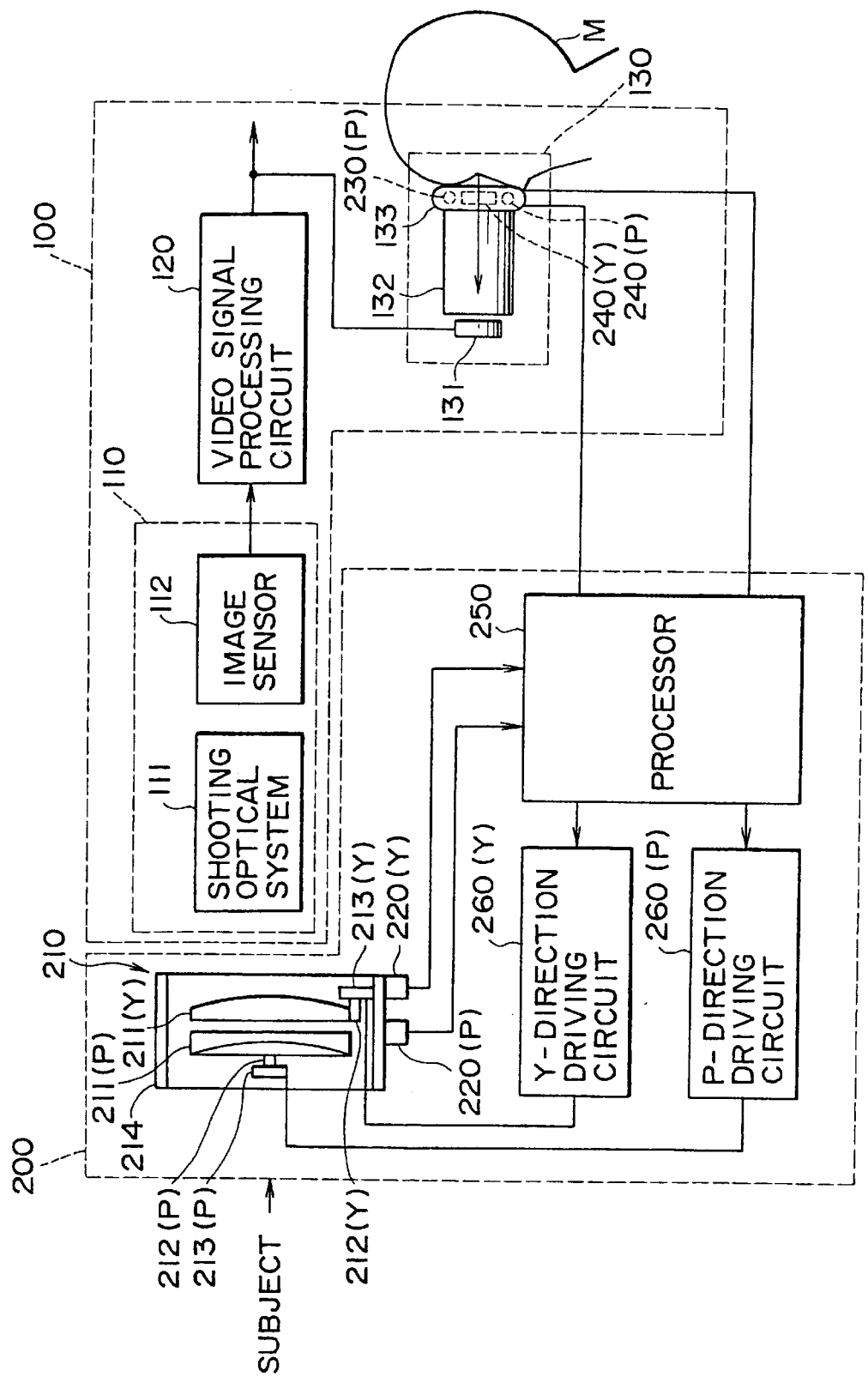
FIG. 1 is a block diagram showing the configuration of a first embodiment of the present invention.

FIG. 1 is a block diagram showing the configuration of a first embodiment which represents the image stabilizer of the present invention. In FIG. 1, there is given an exemplary case where the image stabilizer of the present invention is employed as a manual image stabilizing optical apparatus for a video camera. FIG. 1 relates to the configuration of an entire video camera system equipped with the image stabilizer of this embodiment.

The video camera shown in FIG. 1 has a camera body 100 and a image stabilizer 200 for correcting a manual shake of the video camera. The image stabilizer 200 is formed to be demountable from the camera body 100. That is, the image stabilizer 200 is in the form of an adaptor usable when necessary.

The camera body 100 has a camera section 110 for converting a shot subject image into an electric pickup image signal, a video signal processing circuit 120 for converting the output pickup image signal of the camera section 110 into a video signal, and a viewfinder 130 used by a cameraman M for monitoring the shot image when shooting the subject.

The camera section 110 has a shooting optical system 111 for producing a subject image, and an image sensor 112 for converting the subject image, which has been produced by the shooting optical system 111, into an electric image pickup signal. The shooting optical system 111 is so designed that its focal distance is changeable. The image sensor 112 consists of, e.g., a charge coupled device. The structure of the camera section 110 may be in a single-plate type configuration, or in a two-plate, three-plate or four-plate type configuration using dichroic prisms or dichroic mirrors.

The viewfinder 130 has a display 131 for displaying the shot image thereon, an optical barrel 132 for guiding the shot image on the display 131 to the cameraman's eye, and a magnifier 133 (FIG. 2) with an eyecup 132. The eyecup 132 is composed of a soft material such as rubber.

The image stabilizer 200 makes a discrimination as to whether any relative angular displacement of the shooting optical axis caused by a shake of the video camera is derived from the cameraman's intended shake or not, and then executes a process to correct the shake in the case of any unintended shake, or holds the preceding corrected state in the case of any intended shake.

When detecting the shake of the-video camera, the image stabilizer 200 performs a detection by the use of two axes which are vertical to the optical axis and orthogonal mutually. Such two axes are, for example, in the pitching P-direction (tilting direction) and the yawing Y-direction (panning direction).

The image stabilizer 200 is so formed as to execute a shake correction optically. That is, the image stabilizer 200 corrects the manual shake by correcting the angle of the transmission optical axis on the basis of the shake detection output obtained with respect to the video camera. Here, the angle of the transmission optical axis signifies the angle of the outgoing-side optical axis to the incident-side optical axis in the optical system.

Hereinafter the structure of the image stabilizer 200 will be described in detail. In the following explanation, P is added to each of reference numerals for component elements relative to the pitching P-direction, and Y is added to each of reference numerals for component elements relative to the yawing Y-direction.

Figure 3:
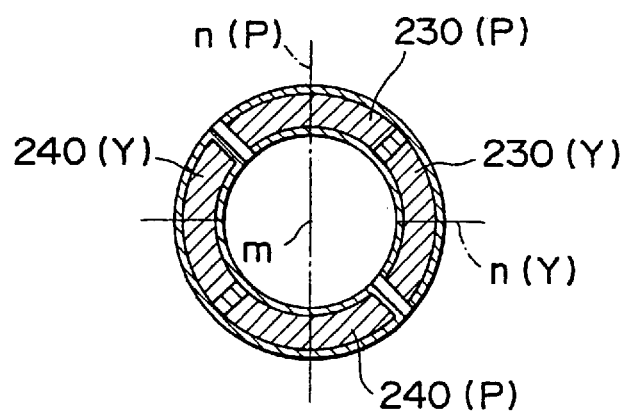
FIG. 3 is another sectional view for explaining the disposition and structure of the pressure-sensitive elements in the first embodiment.

The image stabilizer 200 shown in FIG. 1 has a shake correcting mechanism 210; shake detectors 220(P) and 220(Y); pressure-sensitive elements 230(P), 230(Y), 240(P) and 240(Y) (see FIG. 3 for pressure-sensitive element 230 (Y)); a processor 250; and driving circuits 260(P) and 260(Y). Since the pressure-sensitive elements 230(P), 230 (Y), 240(P) and 240(Y) are embedded in the eyecup 133 as will be described later, these elements are not included within the broken line which denotes the image stabilizer 200.

The shake correcting mechanism 210 has a function of changing the angle of the transmission optical axis. The shake detector 220(P) has a function of detecting the shake component (directional change) of the video camera in the pitching P-direction (angular displacement (angular velocity) per unit time in the pitching P-direction). Meanwhile the shake detector 220(Y) has a function of detecting the shake component of the video camera in the yawing Y-direction (angular displacement (angular velocity) per unit time in the yawing Y-direction). Each of these shake detectors 220(P) and 220(Y) consists of an angular velocity sensor such as a vibrating gyro for example.

The pressure-sensitive elements 230(P) and 240(P) have a function of detecting the shake component (directional change) of the cameraman M's face to the video camera in the pitching P-direction (angular displacement (angular velocity) per unit time in the pitching P-direction). Meanwhile the pressure-sensitive elements 230(Y) and 240(Y) have a function of detecting the shake component of the cameraman M's face to the video camera in the yawing Y-direction (angular displacement (angular velocity) per unit time in the yawing Y-direction). Here, each pressure-sensitive element is one capable of outputting an electric signal of an amplitude proportional to the pressure applied thereto. The positional configuration of such pressure-sensitive elements 220(P), 230(P), 220(Y) and 230(Y) will be described later in detail.

The processor 250 has a function of making a discrimination, on the basis of the detection outputs of the shake detectors 220(P) and 220(Y) and also the detection outputs of the pressure-sensitive elements 230 (P), 240(P), 230(Y) and 240(Y), as to whether the shake of the video camera is the one intended by the cameraman or not, then calculating, in the case of any unintended shake, a correction target value to correct the shake on the basis of the detection outputs of the shake detectors 220(P) and 220(Y), or holding the preceding correction target value in the case of any intended shake.

The correction target value consists of a target value in the pitching P-direction and a target value in the yawing Y-direction. The correction target value in the pitching P-direction signifies a rotation angle of a plano-concave lens 211(P) necessary for correcting the shake in the pitching P-direction, and the correction target value in the yawing Y-direction signifies a rotation angle of a plano-convex lens 211(Y) necessary for correcting the shake in the yawing Y-direction. The processor 250 consists of, e.g., a central processing unit (hereinafter referred to as CPU).

The driving circuit 260(P) has a function of rotating an undermentioned driving motor 213(P) in the pitching P-direction on the basis of the correction target value in the pitching P-direction outputted from the processor 250. Meanwhile the driving circuit 260(Y) has a function of rotating a driving motor 213(Y) in the yawing Y-direction on the basis of the correction target value in the yawing Y-direction outputted from the processor 250.

The shake correcting mechanism 210 has a plano-concave lens 211(P) for changing the angle of the transmission optical axis in the pitching P-direction, a plano-convex lens 211(Y) for changing the angle of the transmission optical axis in the yawing Y-direction, a rotary shaft 212(P) for rotatably supporting the plano-concave lens 211(P) within a plane perpendicular to the optical axis thereof, and a rotary shaft 212(Y) for rotatably supporting the plano-convex lens 211(Y) within a plane perpendicular to the optical axis thereof. These component parts constitute an optical-axis angle changing mechanism. A detailed explanation will be given later on the structure of this optical-axis angle changing mechanism.

The shake correcting mechanism 210 further has a driving motor 213(P) for rotating the plano-concave lens 211(P), a driving motor 213(Y) for rotating the plano-convex lens 211(Y), and a barrel casing 214 for housing the lenses 211(P), 211(Y) and so forth therein. The barrel casing 214 is so disposed that its center axis is aligned with the optical axis of the shooting optical system 111. In the barrel casing 215, there are housed the lenses 211(P) and 211(Y), the rotary shafts 212(P) and 212(Y), and the driving motors 213(P) and 213(Y). Meanwhile on the outside of the barrel casing 215, the shake detectors 220(P) and 220(Y) are disposed. In this case, each of the shake detectors 220(P) and 220(Y) is so positioned as to be directionally coincident with the shake detection thereof. The above is the entire configuration of the whole video camera.

Figure 2:
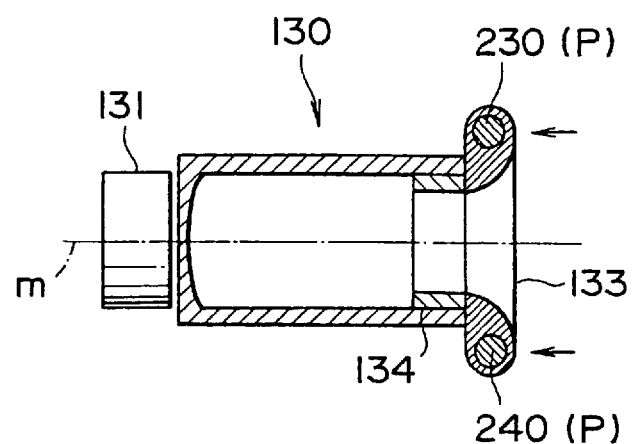
FIG. 2 is a sectional side view for explaining the disposition and structure of pressure-sensitive elements in the first embodiment.

Referring now to FIGS. 2 and 3, a description will be given below on the positional configuration of the pressure-sensitive elements 230(P), 240(P), 230(Y) and 240(Y). FIG. 2 is a sectional side view of the optical barrel 132 and the magnifier 134 with the eyecup 133. And FIG. 3 is a sectional view of the eyecup 133 taken along a plane perpendicular to the optical axis a of the optical barrel 132.

As shown in FIG. 3, the pressure-sensitive elements 230(P), 240(P), 230(Y) and 240(Y) are so disposed as to be spaced apart from one another at angular intervals of 90 degrees around the center axis a of the optical barrel 132. In this case, the pressure-sensitive elements 230(P) and 240(P) are positioned on a pitching P-direction straight line n(P) passing through a center axis m. Due to this arrangement, the pressure-sensitive elements 230(P) and 240(P) detect the pitching P-direction shake component of the cameraman's face to the video camera. On the other hand, the pressure-sensitive elements 230(Y) and 240(Y) are positioned on a yawing Y-direction straight line n(Y) passing through the center axis m. Due to this arrangement, the pressure-sensitive elements 230(Y) and 240(Y) detect the yawing Y-direction shake component of the cameraman's face to the video camera.

The pressure-sensitive elements 230(P), 240(P), 230(Y) and 240(Y) are embedded in the eyecup 133. Consequently, there may arise some problems as to whether a pressure from the cameraman's face is applied properly to the pressure-sensitive elements 230(P), 240(P), 230(Y) and 240(Y), and also as to whether the image stabilizer 200 can be formed into an adaptor inclusive of the pressure-sensitive elements 230(P), 240(P), 230(Y) and 240(Y).

However, since the eyecup 133 is composed of a soft material such as rubber as described, the pressure from the cameraman's face can be applied properly to the pressure-sensitive elements 230(P), 240(P), 230(Y) and 240(Y) even in a state where these elements are embedded in the eyecup 133.

Moreover, the magnifier 134 provided with the eyecup 133 is demountable from the optical barrel 132. Therefore, even if the pressure-sensitive elements 230(P), 240(P), 230 (Y) and 240(Y) are embedded in the eyecup 133, it is possible to form the image stabilizer 200 into an adaptor inclusive of the pressure-sensitive elements 230 (P), 240(P), 230(Y) and 240(Y).

Next, the structure of the optical-axis angle changing mechanism will be described with reference to FIG. 4. This diagram is a perspective view showing the structure of the optical-axis angle changing mechanism.

Figure 4:
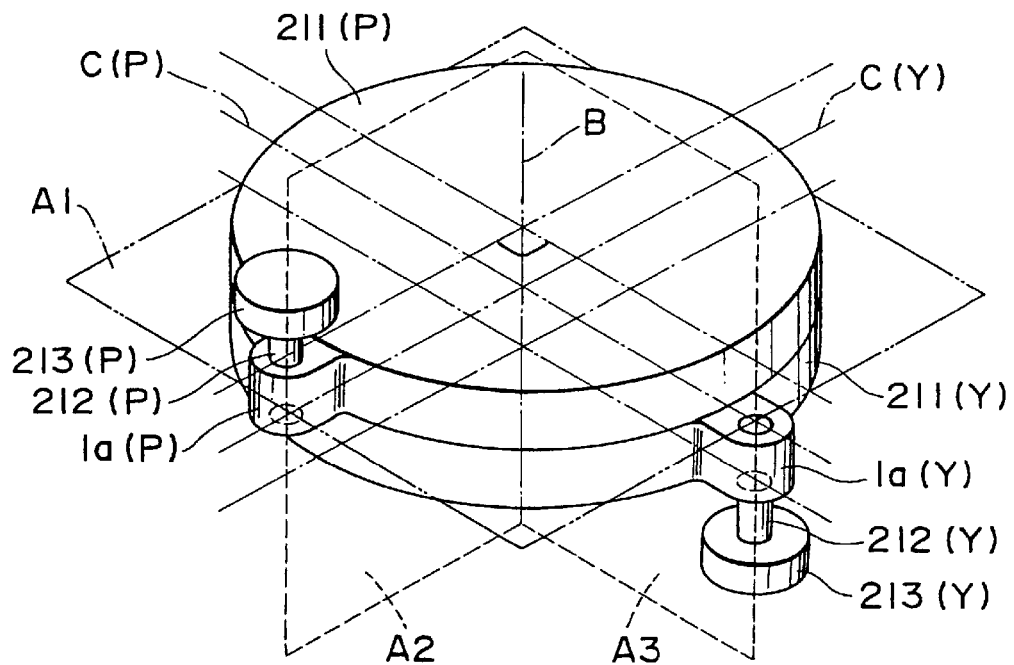
FIG. 4 is a perspective view illustrating the structure of an optical-axis angle changing mechanism in the first embodiment.

As shown in FIG. 4, the plano-concave lens 211(P) and the plano-convex lens 211(Y) are so shaped as to be substantially the same in both diameter and focal distance. These two lenses 211(P) and 211(Y) are disposed opposite to each other in a manner to be slightly spaced apart via a virtual plane Al. Consequently, the two lenses 211(P) and 211(Y) constitute an afocal optical system as a whole.

In this case, the two lenses 211(P) and 211(Y) are disposed opposite to each other with the respective planes opposed mutually, as shown in FIG. 1. These two lenses 211(P) and 211(Y) are so positioned that the common optical axis B thereof is in alignment with the optical axis of the shooting optical system 111. Therefore, the two lenses 211(P) and 211(Y) are so disposed that the common optical axis B thereof is aligned with the center of an image area. Here, the common optical axis B signifies an axis obtained when the respective optical axes of the two lenses 211(P) and 211(Y) are rendered coincident with each other.

The plano-concave lens 211(P) is supported rotatably by the rotary shaft 212(P) via a bearing la(P) provided at the periphery of this lens. The rotary shaft 212(P) is disposed in parallel with the optical axis of the plano-concave lens 211(P). Accordingly the plano-concave lens 211(P) is supported rotatably within a plane perpendicular to the optical axis thereof.

The plano-convex lens 211(Y) is supported rotatably by the rotary shaft 212(Y) via a bearing la(Y) provided at the periphery of this lens. The rotary shaft 212(Y) is disposed in parallel with the optical axis of the plano-convex lens 211(Y). Accordingly, the plano-convex lens 211(Y) is supported rotatably within a plane perpendicular to the optical axis thereof.

In this case, the rotary shafts 212(P) and 212(Y) are so positioned that a plane A2, which includes the rotary shaft 212(P) and the common optical axis B, is substantially orthogonal to a plane A3 including the rotary shaft 212(Y) and the common optical axis B, whereby the lenses 211(P) and 211(Y) are rotated in the directions substantially orthogonal to each other.

The rotary shaft 212(P) is positioned on a yawing Y-direction straight line (hereinafter referred to as "horizontal line" ) C(Y) passing through the common optical axis B, whereby the plano-concave lens 211(Y) is rotated in the pitching P-direction. Similarly, the rotary shaft 212(Y) is positioned on a pitching P-direction straight line (hereinafter referred to as "vertical line")C(P) passing through the common optical axis B, whereby the plano-concave lens 211(Y) is rotated in the yawing Y-direction.

The above is the structure of the optical-axis angle changing mechanism. The aforementioned driving motor 213(P) is connected directly to the rotary shaft 212(P) of the plano-concave lens 211(P) from the side opposite to the virtual plane Al. Similarly, the aforementioned driving motor 213(Y) is connected directly to the rotary shaft 212(Y) of the plano-convex lens 211(Y) from the side opposite to the virtual plane Al.

In the structure described above, the following operation is performed.

First, an explanation will be given on the image pickup operation of the video camera. In FIG. 1, the image of the subject is formed on the image sensor 112 through the lenses 211(P), 211(Y) and the shooting optical system 111. The subject image thus formed on the image sensor 112 is converted into a corresponding electric image signal, which is then supplied to the video signal processing circuit 120 to be thereby converted into a video signal.

The video signal thus obtained is supplied to, e.g., an unshown recording/reproducing section to be thereby recorded on a magnetic tape. And simultaneously the video signal is supplied also to the display 131 of the viewfinder 130. Then the pickup image of the subject being shot is displayed. Consequently, the cameraman is enabled to shoot the subject while monitoring the shot image. The image pickup operation of the video camera is performed in the manner mentioned above.

Next, an explanation will be given on the shake correction executed by the image stabilizer 200. Prior to explaining the entire operation of the image stabilizer 200, the operation of the optical-axis angle changing mechanism will be described first for making the entire operation better understood.

The optical-axis angle changing mechanism employing an afocal optical system changes the angle of the transmission optical axis by shifting the lenses 211(Y) and 211(P), which constitute the optical system as mentioned, in the directions perpendicular respectively to the optical axes thereof. An example of such shift is shown in FIG. 5, which is a sectional side view of the afocal optical system.

Figure 5:
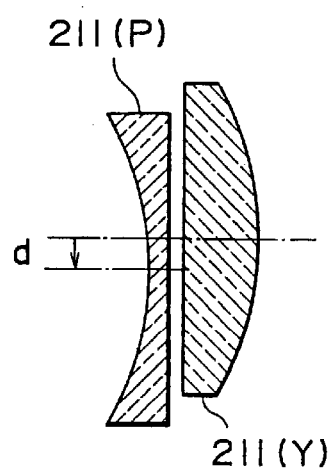
FIG. 5 is a schematic diagram for explaining how the angle of the optical axis is changed in an afocal optical system.

FIG. 5 shows an exemplary case of shifting the plano-concave lens 211(P) downward by a distance d. Such shift may be realized by, for example, supporting the plano-concave lens 211(P) by means of a suspension parallel to the optical axis and shifting the plano-concave lens 211(P) with a linear motion by a distance d. This state is shown in FIG. 6, which is a front view of the optical system seen from the front of the video camera for example.

However, in this embodiment where the plano-concave lens 211(P) is supported rotatably by the rotary shaft 212(P), the plano-concave lens 211(P) is shifted downward with a circular motion by the distance d. This state is shown in FIG. 7, which is also a front view of the optical system seen from the front of the video camera for example.

Figure 9:
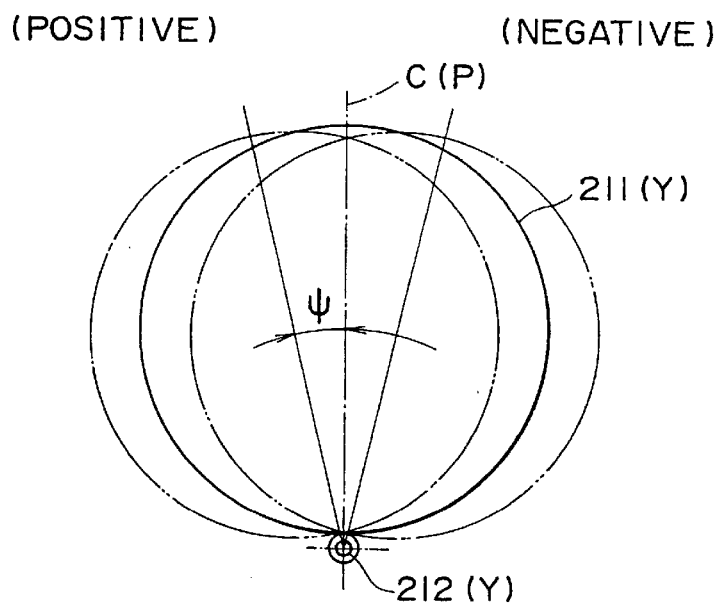
FIG. 9 is a schematic diagram showing a rotation locus of a plano-convex lens used in the first embodiment.
Figure 10:
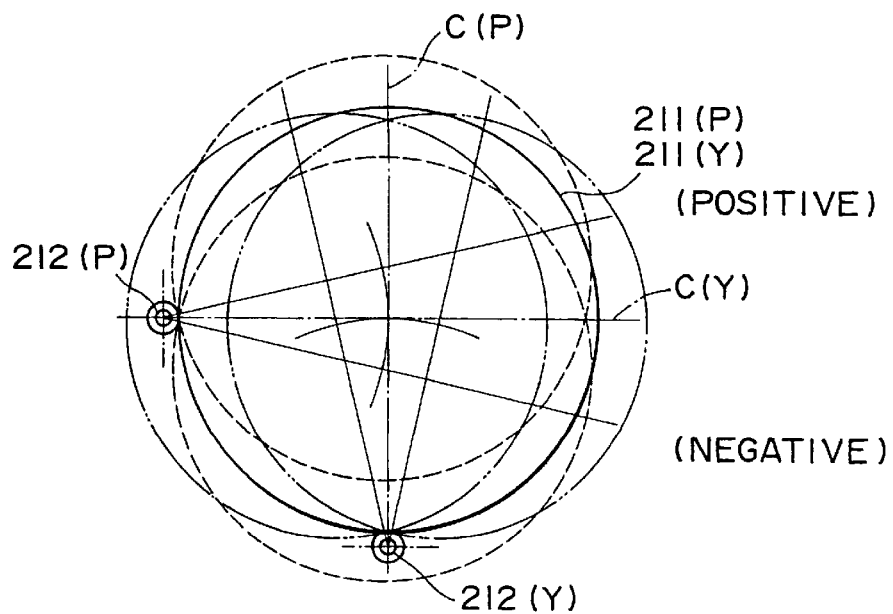
FIG. 10 is a schematic diagram showing composite rotation loci of the plano-concave lens and the plano-convex lens in the first embodiment.

FIGS. 8 to 10 are diagrams showing rotations of the lenses 211(P) and 211(Y). These diagrams are front views of the lenses 211(P) and 211(Y) seen from the front of the video camera for example. FIG. 8 shows the rotation locus of the plano-concave lens 211(P); FIG. 9 shows the rotation locus of the plano-convex lens 211(Y); and FIG. 10 shows a state where the respective rotation loci of the lenses 211(P) and 211(Y) are mutually superposed.

As shown in FIG. 8, the plano-concave lens 211(P) is rotated in either direction from a horizontal line C(Y) passing through the rotary shaft 212(P). This diagram illustrates a state where the plano-concave lens 211(P) is rotated by an angle θ from the horizontal line C(Y) toward the positive side (e.g., upward in the diagram) or toward the negative side (e.g., downward in the diagram).

The angular displacement of the video camera caused in the pitching P-direction by a manual shake or the like is normally within ±1°. Therefore, merely a small rotation angle of the plano-concave lens 211(P) is required for correction of such a shake. Consequently the rotation locus of the plano-concave lens 211(P) is corrected to be substantially coincident with the pitching P-direction. As a result, the angle of the transmission optical axis is displaced to be substantially coincident with the pitching P-direction.

As shown in FIG. 9, the plano-convex lens 211(Y) is rotated in either direction from a vertical line C(P) passing through the rotary shaft 212(Y). This diagram illustrates a state where the plano-convex lens 211(Y) is rotated by an angle θ from the horizontal line C(P) toward the positive side (e.g., leftward in the diagram) or toward the negative side (e.g., rightward in the diagram).

The angular displacement of the video camera caused in the yawing Y-direction by a manual shake or the like is normally within ±1°. Therefore, merely a small rotation angle of the plano-convex lens 211(Y) is required for correction of such a shake. Consequently the rotation locus of the plano-convex lens 211(Y) is corrected to be substantially coincident with the yawing Y-direction. As a result, the angle of the transmission optical axis is displaced to be substantially coincident with the yawing Y-direction.

Due to the above operation, when the rotation locus of the plano-concave lens 211(P) and that of the plano-convex lens 211(Y) are mutually superposed as illustrated in FIG. 10, the angle of the transmission optical axis can be displaced in any of the all directions prescribed by the two orthogonal axes.

Figure 11:
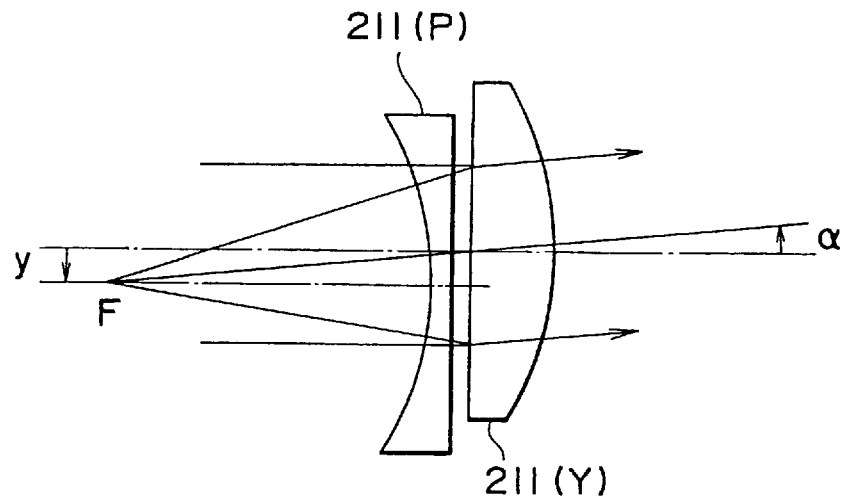
FIG. 11 is a schematic diagram for explaining the operation of the optical-axis angle changing mechanism in the first embodiment.

FIG. 11 shows an exemplary state where the angle of the transmission optical axis has been displaced toward the positive side in the pitching P-direction.

Suppose now that the lenses 211(P) and 211(Y) are positioned in a state where the optical axes thereof are in alignment with each other. If the light of a subject to be shot or the like is incident on the plano-concave lens 211(P) in parallel to the optical axis thereof, a virtual image is formed at a focal point F of the plano-concave lens 211(P), so that divergent light is outputted from the plano-concave lens 211(P) with its focal point F serving as a virtual light source.

Subsequently the divergent light is incident on the plano-convex lens 211(Y) which is the same in focal distance as the plano-concave lens 211(P), whereby parallel light is outputted from the plano-convex lens 211(Y) with the above virtual light source serving as a light source of the focal point F.

In this state, when the plano-concave lens 211(P) is displaced by a distance y toward the negative side in the pitching P-direction as shown in FIG. 11, the angle of the transmission optical axis is displaced by α toward the positive side in the pitching P-direction. Consequently, the parallel light displaced by an angle α from the optical axis of the incident light is outputted from the plano-convex lens 211(Y), as shown in FIG. 11.

In this case, the angle is expressed by Eq. (1) given below, where f denotes the focal distance of the lenses 211(P) and 211(Y).

$$\alpha = \tan^{-1}(y/f) \tag{1}$$

Although a detailed explanation is omitted here, when the plano-concave lens 211(P) is displaced toward the A positive side in the pitching P-direction, the angle of the transmission optical axis can be displaced toward the negative side in the pitching P-direction. Similarly, when the plano-convex lens 211(Y) is shifted toward the positive or negative side in the yawing Y-direction, the angle of the transmission optical angle can be displaced toward the negative or positive side in the yawing Y-direction.

Thus, with rotations of the lenses 211(P) and 211(Y), it is possible to displace the angle of the transmission optical axis in any of the all directions prescribed by the two orthogonal axes, hence suppressing the shake of the shot image caused by a manual shake or the like. The above is the operation of the optical-axis angle changing mechanism.

Next, the overall operation of the image stabilizer 200 will be described below. When there is no shake of the video camera, the lenses 211(P) and 211(Y) are so positioned that the respective optical axes are in alignment with the center of the image area.

Upon occurrence of any shake of the video camera in this state, such shake is detected by the shake detectors 214(P) and 214(Y). In this case, the shake component in the pitching P-direction is detected by the shake detector 214(P), while the shake component in the yawing Y-direction is detected by the shake detector 214(Y), whereby the shake of the video camera in the all directions can be detected as components in the directions of two mutually orthogonal axes. The detection output thus obtained is supplied to the processor 250.

Figure 12:
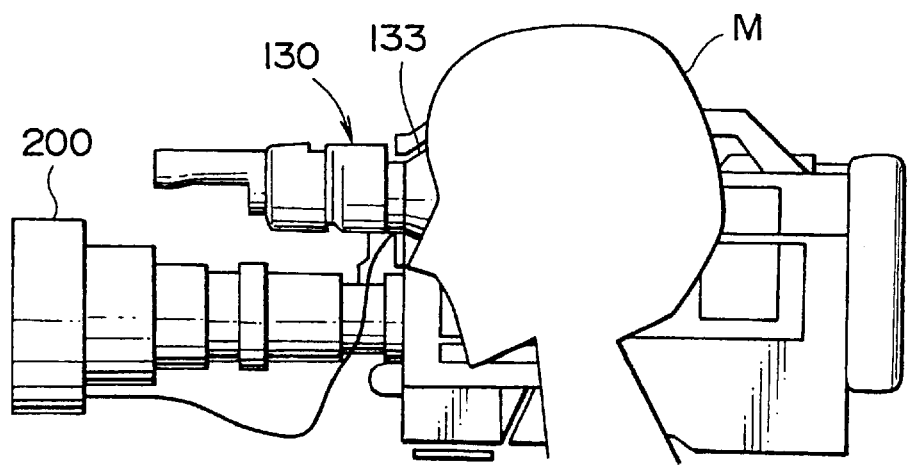
FIG. 12 illustrates a shooting posture with a video camera.

If there occurs a shake of the cameraman's face to the video camera, this shake is detected by the pressure-sensitive elements 230(P), 230(Y), 240(P) and 240(Y). When shooting a subject, as illustrated in FIG. 12, the cameraman keeps pressing his forehead or cheek against the eyecup 133 while monitoring the shot image. Therefore, if the cameraman's face remains directionally unchanged to the video camera, the detection outputs obtained from the pressure-sensitive elements 230(P), 230(Y), 240(P) and 240(Y) are maintained constant. However, upon occurrence of any shake of the cameraman's face to the video camera, the detection outputs from the pressure-sensitive elements 230(P), 230(Y), 240(P) and 240(Y) are varied. Consequently, it is possible to detect the shake of the cameraman's face to the video camera.

In this case, the shake component in the pitching P-direction is detected by the pressure-sensitive elements 230(P) and 240(P), while the shake component in the yawing Y-direction is detected by the pressure-sensitive elements 230(Y) and 240(Y), so that the shake of the cameraman's face to the video camera in all directions can be detected as components in the directions of two mutually orthogonal axes. The detection outputs thus obtained are supplied to the processor 250.

Subsequently, on the basis of the detection outputs from the shake detectors 220(P), 220(Y) and the detection outputs from the pressure sensitive elements 230(P), 240 (P), 230(Y) and 240(Y), the processor 250 makes a discrimination as to whether the shake of the video camera is the one intended by the cameraman.

And if the result of such discrimination signifies an unintended shake, the processor 250 calculates new correction target values on the basis of the detection outputs from the shake detectors 220(P) and 220(Y), and then supplies the calculated values to the driving circuits 230(P) and 230(Y). In response to the calculated values thus received, the driving circuits 230(P) and 230(Y) rotate the driving motors 213(P) and 213(Y) respectively by the differences between the calculated values and the current rotation angles of the lenses 211(P) and 211(Y), so that the rotary shafts of the lenses 211(P) and 211(Y) are set to the correction target values. Consequently, the angle of each transmission optical axis is corrected to thereby suppress the shake of the shot image caused by the unintended shake.

In contrast therewith, when the result of the above discrimination signifies an intended shake, the processor 250 supplies the preceding correction target values to the driving circuits 230(P) and 230(Y), whereby the rotation angles of the lenses 211(P) and 211(Y) are held at the current ones. Consequently, the angle of each transmission optical axis is also held at the current angle. The above is the overall operation of the image stabilizer 200.

Figure 13:
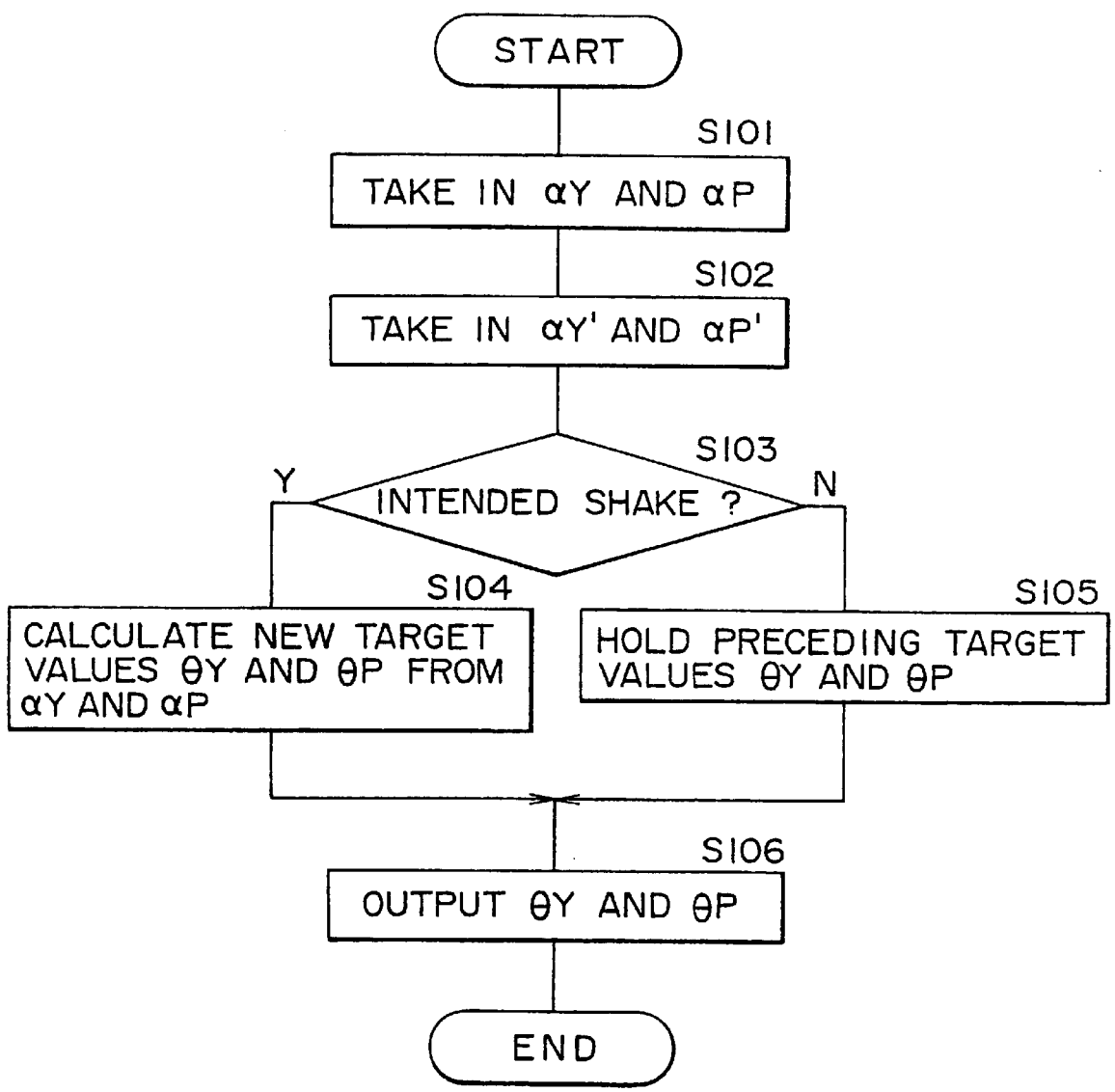
FIG. 13 is a flowchart for explaining the operation of a processor in the first embodiment.

Referring next to FIG. 13, a further detailed explanation will be given on the operation of the processor 250. FIG. 13 is a flowchart of a processing routine executed in the processor 250. The operation of the driving control system (consisting of processor 250, driving circuits 260(P), 260(Y) and driving motors 213(P), 213(Y)) in the image stabilizer 200 is started by turning on a main switch (not shown) and is terminated by turning off the same. And the processing routine shown in FIG. 13 is started by turning on a power switch for the image stabilizer 200.

In this processing routine, the processor 250 first takes in the detection outputs of the shake detectors 220(P) and 220(Y) (step S101), so that the shake component $\alpha P$ in the pitching P-direction of the video camera and the shake component $\alpha Y$ in the yawing Y-direction thereof are taken in.

Subsequently the processor 250 takes in the detection outputs of the pressure-sensitive elements 230 (P), 230(Y), 240(P) and 240(Y) (step S102), so that the shake component $\alpha P'$ in the pitching P-direction of the cameraman's face to the video camera and the shake component $\alpha Y'$ in the yawing Y-direction thereof are taken in.

Thereafter, on the basis of the detection outputs from the shake detectors 220(P), 220(Y) and also the detection outputs from the pressure-sensitive elements 230(P), 240(P), 230(Y) and 240(Y), the processor 250 makes a discrimination as to whether or not the shake of the video camera is the one intended by the cameraman (step S103). The process of this discrimination will be described later in detail.

In the case of an unintended shake, the processor 250 calculates, on the basis of the shake components $\alpha P$ and $\alpha Y$, a correction target value $\theta P$ in the pitching P-direction and a correction target value $\theta Y$ in the yawing Y-direction (step S104). Meanwhile, if the result of the above discrimination signifies an intended shake, the processor 250 holds the preceding correction target values $\theta P$ and $\theta Y$ as new target values without executing any calculation thereof (step S105), and then supplies the correction target values $\theta P$ and $\theta Y$ to the driving circuits 230(P) and 230(Y) respectively (step S106).

Upon termination of the process at step S106, one cycle of the correction is completed. Thereafter the processor 250 executes the foregoing processes from step S101 again. And subsequently the above operation is repeated after completion of each cycle of the correction. This operation is brought to an end by setting the power switch of the image stabilizer 200 to its off-state. The above is the entire routine executed in the processor 250.

Now a detailed explanation will be given on the process of discrimination executed in the processor 250. A discrimination between an intended shake of the video camera and an unintended shake thereof is made by detecting whether the shake of the video camera and that of the cameraman are substantially the same or not. In this case, if the two shakes are substantially the same, the result of the discrimination signifies an intended shake. Meanwhile, if the two shakes are not the same, the result signifies an unintended shake.

Whether the two shakes are substantially the same or not is determined depending on whether the two shakes are substantially in the in-phase relationship and the features thereof are substantially the same. In this case, if the two shakes are substantially in the in-phase relationship and the features thereof are substantially the same, the two shakes are determined to be substantially the same. On the other hand, if the two shakes are not in the in-phase relationship or the features thereof are not the same, the two shakes are determined to be different ones.

Features of a shake include its direction, angle (magnitude) and frequency (velocity). The above discrimination may be executed by adopting all of the three features or merely some of them. For example, the direction and the angle may be selectively adopted. Further, it may be so designed that, when the frequency is smaller than a certain value (e.g., 1 Hz), the shake is determined to be an intended one regardless of the detection outputs of the pressure-sensitive elements 230 (P), 240(P), 230(Y) and 240(Y).

Upon occurrence of any shake of the video camera, a discrimination as to whether the two shakes are substantially in the in-phase relationship or the features thereof are substantially the same or not is executed depending on whether any shake of the cameraman's face to the video camera has occurred or not. And in the case of no occurrence of any shake of the cameraman's face to the video camera, the result of the discrimination signifies that the two shakes are substantially in the in-phase relationship and the features thereof are substantially the same. Meanwhile, in the case of occurrence of any shake of the cameraman's face to the video camera, the result signifies that the two shakes are not in the in-phase relationship or the features thereof are not the same.

Upon occurrence of any shake of the video camera and no occurrence of any shake of the cameraman's face to the video camera, a discrimination that the two shakes are substantially in the in-phase relationship and the features thereof are substantially the same is based on the following two reasons.

The first reason resides in that, when shooting a subject, both the cameraman and the video camera watch the subject. More specifically, at the time of shooting the subject, the cameraman directs the video camera to the subject while observing the viewfinder 130 with his right eye and turning his left eye to the subject. Therefore, if the cameraman directs the video camera to the subject and observes the viewfinder while watching the subject, it naturally follows that the video camera and the cameraman s face are kept directionally coincident with each other during the shooting. Consequently, when the shake of the video camera is the one intended by the cameraman, the shake of the video camera is thus caused without occurrence of any shake of the cameraman's face to the video camera.

The second reason resides in that panning or tilting is executed by the cameraman with the video camera held on his shoulder, as illustrated in FIG. 12. More specifically, panning is a manipulation executed as the cameraman rotates the video camera horizontally by turning his waist in a state where the video camera held on the cameraman's shoulder and his shoulder (and head) are kept together. While tilting is a manipulation executed as the cameraman rotates the video camera by his arm vertically around his shoulder in a state where the video camera and the his head are kept together. Therefore, if the cameraman directs the video camera to the subject while watching the subject, both the video camera and his face are turned together to the subject. Consequently, when the shake of the video camera is the one derived from panning or tilting, the shake of the video camera is thus caused without occurrence of any shake of the cameraman's face to the video camera.

According to the embodiment described above in detail, a shake of the video camera and that of the cameraman's face thereto are detected, and a discrimination is made, on the basis of the two detection outputs thus obtained, as to whether or not the shake of the video camera is the one intended by the cameraman, so that it is possible to exactly discriminate whether the shake of the video camera is the one intended by the cameraman.

Therefore, when the shake of the video camera is the one intended by the cameraman, it becomes possible to prevent unnecessary execution of a manual shake correction. Consequently, incongruous feeling in manipulation of the camera can be eliminated, and a satisfactory shot image is achievable with expression of the cameraman's intention. Further, since the amount of shake correction need not be suppressed to a lower value, it is possible to fully exert the essential characteristics of the image stabilizer, hence ensuring powerful and adequate shooting environment with shake correction. In addition, none of return swing is generated for returning the shift of any erroneous correcting action to the former state, so that the cameraman is given comfortable shooting environment with a complete function of manual shake correction. Besides, there exists no necessity of demanding the cameraman to perform any additional manipulation for avoiding erroneous correction, thereby enabling the cameraman to concentrate on his job or activity. Thus, according to this embodiment, an improved image stabilizer can be provided for use in a video camera for broadcasting business.

Further according to this embodiment, the operation for detecting a shake of the cameraman's face is so performed as to detect the relative shake of the cameraman's face to the video camera instead of detecting the absolute shake of his face, so that a means for detecting the shake of the cameraman's face can be incorporated in the video camera. Consequently, it becomes possible to facilitate handling and so forth of the face shake detection means.

A structure for detecting the shake of the cameraman's face may be so devised as to detect the absolute shake of the cameraman's face. However, in such a structure, the shake detection means for detecting the shake of the cameraman's face needs to be mounted on his head for example. In other words, the shake detection means for detecting the shake of the cameraman's face needs to be formed separately from the video camera.

Therefore, whenever the cameraman goes out for a job, it is necessary for him to carry the shake detection means with him in addition to the video camera, whereby carrying and handling the image stabilizer are troublesome. Moreover, since the cameraman needs to mount the shake detection means on his head at the time of every shooting, the use of such image stabilizer is intricate, and it is rendered impossible for him to properly deal with the job which should be carried out promptly. Besides the above, due to the existence of a cable required for connecting the shake detection means to the video camera, there arise some dangers of damaging the cable and causing accidental catching or the like during the job. And because of such disadvantages, it is unavoidable that the activity of the cameraman is extremely restricted. For the reason mentioned, the image stabilizer of the above structure is not applicable to any professional video camera for use in broadcasting business.

In comparison therewith, this embodiment is so contrived that the shake detection means for detecting the shake of the cameraman's face can be integrated with the video camera, whereby the above-described problem is completely eliminated. Thus, according to this embodiment, an improved image stabilizer can be provided for effective employment in a video camera for broadcasting business.

Next, a second embodiment of the present invention will be described below in detail.

In the foregoing first embodiment explained above, pressure-sensitive elements are embedded in an eyecup of a viewfinder for detecting any shake of a cameraman's face, and the shake is detected by the use of such pressure-sensitive elements. Differing therefrom, the second embodiment is so contrived that light emitting elements and light-received position detectors are disposed in a viewfinder, and the shake is detected by means of such components.

FIGS. 14 and 15 show the configuration of principal components in the second embodiment. In FIGS. 14 and 15, any components corresponding functionally to the aforementioned elements in FIG. 1 are denoted by like reference numerals, and a detailed explanation thereof is omitted. FIG. 14 is a schematic diagram of a light emitting element 261 and a light-received position detector 262 in this embodiment seen from the side of a viewfinder 130, and FIG. 15 is a schematic diagram of the same components seen from an eyecup of the viewfinder 130.

As shown, the light-received position detector 262 is detachably attached to a mount 263 provided in an axial center portion of an optical barrel 132. In this case, the light-received position detector 262 is so attached as to stand upright from the optical barrel 132.

The light-received position detector 262 has a light receiving portion 1b to receive reflected light. A light receiving plane 2b of this light receiving portion 1b is formed to be flat. The light receiving plane 2b is set to be substantially parallel to a plane perpendicular to the center axis of the optical barrel 132 and is turned toward a cameraman's face.

A plurality of light receiving elements 3b are arrayed in the form of a matrix on the light receiving plane 2b of the light receiving portion 1b. The direction of rows of this matrix is set substantially to the yawing Y-direction, while the direction of columns thereof is set substantially to the pitching P-direction. The light receiving portion 1b of the light-received position detector 262 consists of, e.g., a charge coupled device. And the light emitting element 261 is positioned at the center of the light receiving portion 1b for example.

Figure 16:
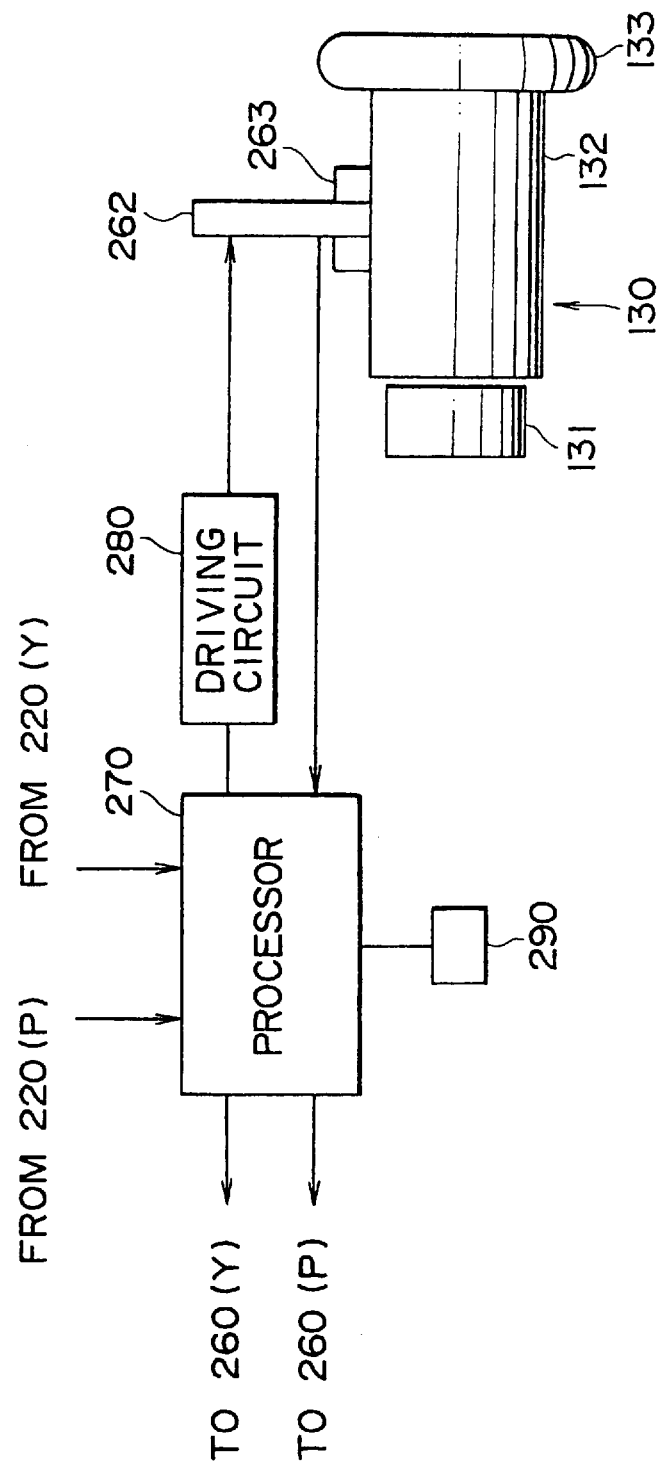
FIG. 16 is a block diagram showing a circuit configuration in the second embodiment.

FIG. 16 shows a circuit configuration of the second embodiment. In this diagram, reference numeral 270 denotes a processor corresponding to the aforementioned processor 250 in FIG. 1. Denoted by 280 is a driving circuit to drive the light emitting element 261, and 290 denotes a register button for registering the initial position of reflected light. The processor 270 has, in addition to a function of executing a shake correction, a function of actuating the driving circuit 280 and also a function of registering the initial position of the reflected light prior to start of shooting.

In the structure mentioned above, the following operation is performed. When the main switch of the video camera is turned on, the processor 270 actuates the driving circuit 280 to thereby drive the light emitting element 261. As a result, light is outputted from the light emitting element 261. Therefore, if a cameraman presses the forehead or cheek of his face against the eyecup 133, the cameraman's forehead is illuminated with the light outputted from the light emitting element 261. The light illuminating his forehead is reflected therefrom and then is received by the light receiving portion 1b of the light-received position detector 262.

Figure 17:
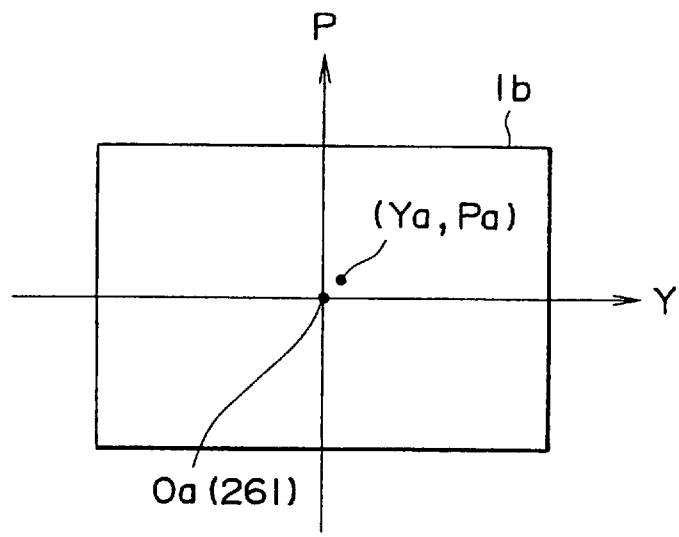
FIG. 17 is a diagram for explaining the operation of the second embodiment.

When the cameraman manipulates the register button 290 in this state, the processor 270 registers the received position of the reflected light as its initial position. The received position of the reflected light is represented by the position of the relevant light receiving element 3b, which is currently receiving the reflected light, out of the plurality of light receiving elements 3b arrayed on the light receiving plane 2b of the light receiving portion 1b. As shown in FIG. 17, the position of the relevant light receiving element 3b is expressed by orthogonal coordinates (Ya, Pa) whose origin is at the center Oa (where the light emitting element 261 is provided) of the light receiving portion 1b. Here, Ya stands for the coordinate in the yawing Y-direction, and Pa for the coordinate in the pitching P-direction.

Figure 18:
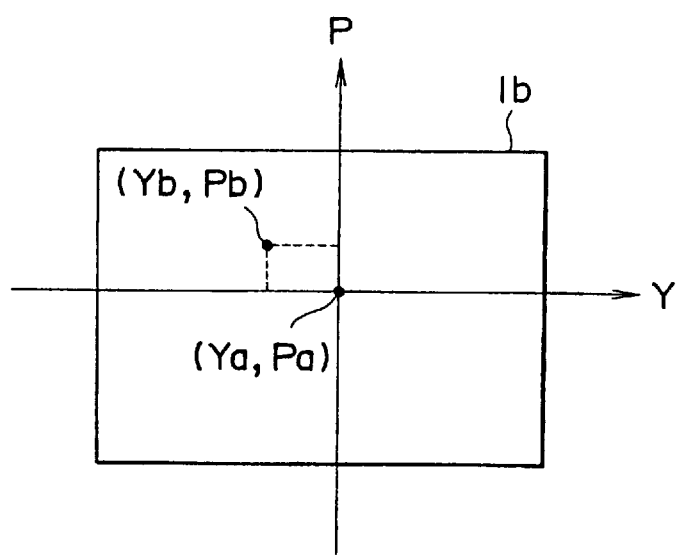
FIG. 18 is another diagram for explaining the operation of the second embodiment.

Upon termination of the registration, the processor 270 executes a shake correction on the basis of the detection outputs of the shake detectors 220(P), 220(Y) and the detection output of the light-received position detector 262. Such process of shake correction is the same as that executed in the foregoing first embodiment. In this case, the processor 270 judges the shake of the cameraman's face to the video camera in accordance with a change of the reflected-light received position. This position is represented by the position of the relevant light receiving element 3b, which is currently receiving the reflected light, out of the plurality of light receiving elements 3b arrayed on the light receiving plane 2b of the light receiving portion 1b. The position of the relevant light receiving element 3b is expressed by orthogonal coordinates (Yb, Pb) whose origin is the initial position (Ya, Pa), as shown in FIG. 18. Here, Yb stands for the coordinate in the yawing Y-direction, and Pb for the coordinate in the pitching P-direction.

In the second embodiment mentioned above, it is also possible to attain similar effects as in the foregoing first embodiment. Although a power switch for the light emitting element 261 was not mentioned in the above explanation, if this power switch is embedded in the eyecup 133, the light emitting element 261 emits its light output when the cameraman presses the forehead of his face or the like against the eyecup 133, whereby the power consumption of the light emitting element 261 can be reduced. Further, although no explanation was given above with regard to the position of the register button 290, if this button is embedded in the eyecup 133, a manipulation for registration can be performed when the cameraman presses the forehead of his face or the like against the eyecup 133.

Next, a third embodiment of the present invention will be described below in detail. The aforementioned first embodiment represents an example which employs an optical-axis angle changing mechanism having an afocal optical system to correct the angle of the transmission optical axis. In contrast therewith, the third embodiment represents another example of employing a different optical-axis angle changing mechanism which uses a vertical-angle variable prism.

Figure 19:
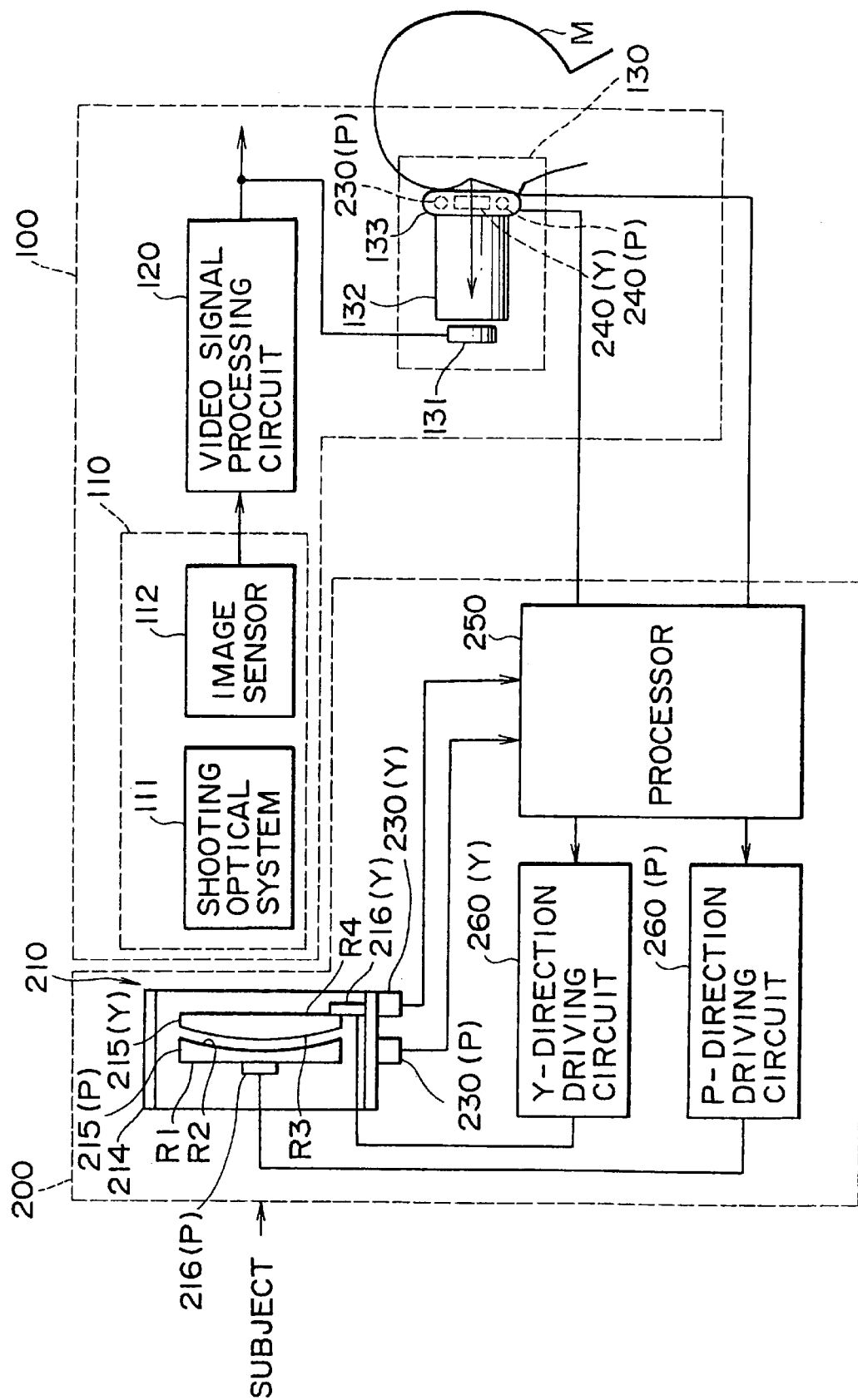
FIG. 19 is a block diagram showing the configuration of a third embodiment of the present invention.

FIG. 19 is a block diagram showing the structure of a image stabilizer in the third embodiment. In this diagram, any component elements corresponding functionally to those shown in FIG. 1 are denoted by like reference numerals, and a detailed explanation thereof is omitted.

In FIG. 19, a vertical-angle variable prism consists of a plano-concave lens 215(P) having a plane R1 and a concave curvature surface R2, and a plano-convex lens 215(Y) having a concave curvature surface R3 and a plane R4. In this case, the lenses 215(P) and 215(Y) are disposed opposite to each other with the respective curvature surfaces R2 and R3 positioned in the mutual proximity.

In this state, the two lenses 215(P) and 215(Y) are rotated in such a manner that the curvature surfaces R2 and R3 thereof are orthogonal to each other. In this case, the plano-concave lens 215(P) is rotated in the pitching P-direction, while the plano-convex lens 215(Y) is rotated in the yawing Y-direction. Consequently the respective planes R1 and R4 of the two lenses 215(P) and 215(Y) are inclined, so that the vertical angle of the vertical-angle variable prism is varied. As a result, the angle of the transmission optical axis is changed with a two-dimensional refraction to thereby correct the relative angular displacement of the shooting optical axis caused by the shake of the video camera.

A polar axis rotating mechanism for example is used as a mechanism to support the lenses 215(P) and 215(Y) rotatably. Such a polar axis rotating mechanism will be explained here with reference to FIG. 20. Assume now a virtual sphere Q whose curvature radius is equal to that of the convex curvature surface of the plano-convex lens 215(Y) for example. In this case, the polar axis rotating mechanism serves to rotate and guide the plano-convex lens 215(Y) around an axis which is a straight line X connecting the center Qc of such virtual sphere to an axial support point 212(Y) outside the plano-convex lens 215(Y). The lenses 215(P) and 215(Y) are driven and rotated by the driving motors 216(P) and 216(Y), respectively. Each of the driving motors 216(P) and 216(Y) may consist of a coreless type motor having a high response speed, or a voice coil motor used as a linear motor or the like.

Besides the above example, the mechanism for rotatably supporting the lenses 215(P) and 215(Y) may have another structure that rotates the plano-concave lens 215(P) on a curvature slide guide in the pitching P-direction while rotating the plano-convex lens 215(Y) on a curvature slide guide in the yawing Y-direction.

Figure 20:
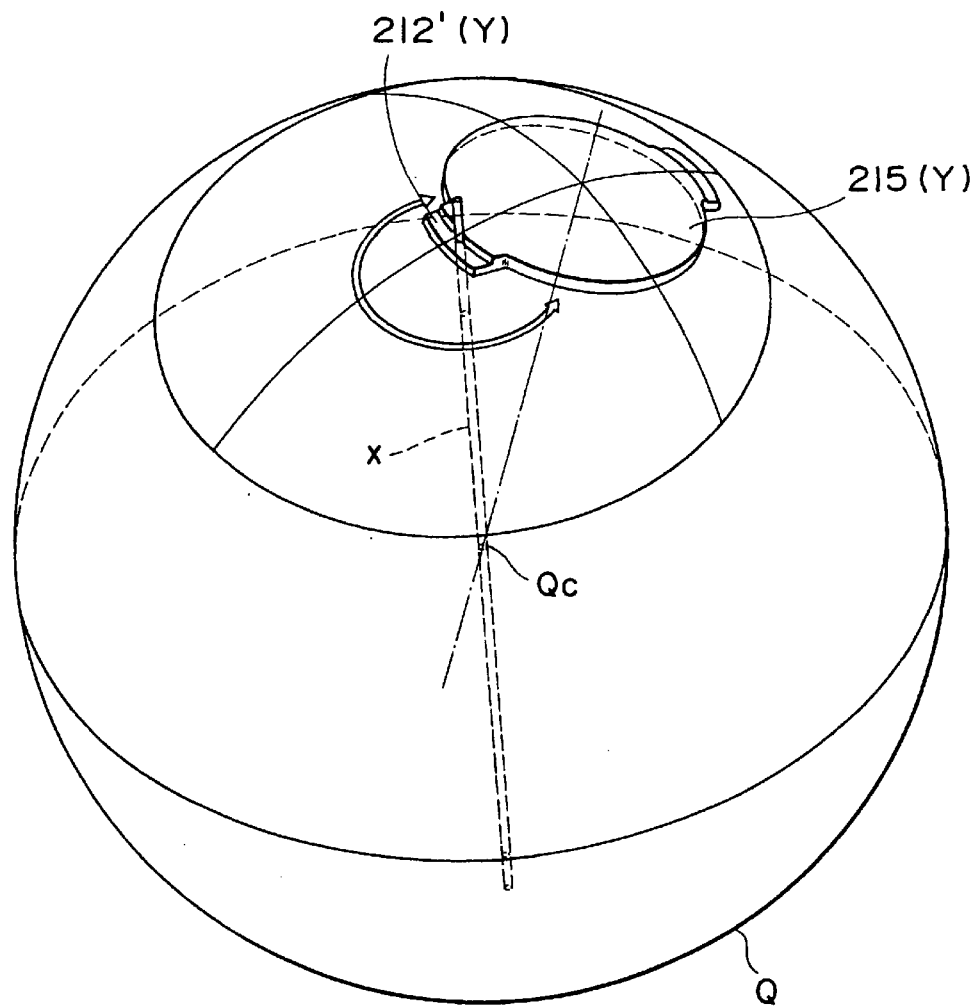
FIG. 20 is a diagram for explaining a polar axis rotating mechanism.
Figure 21:
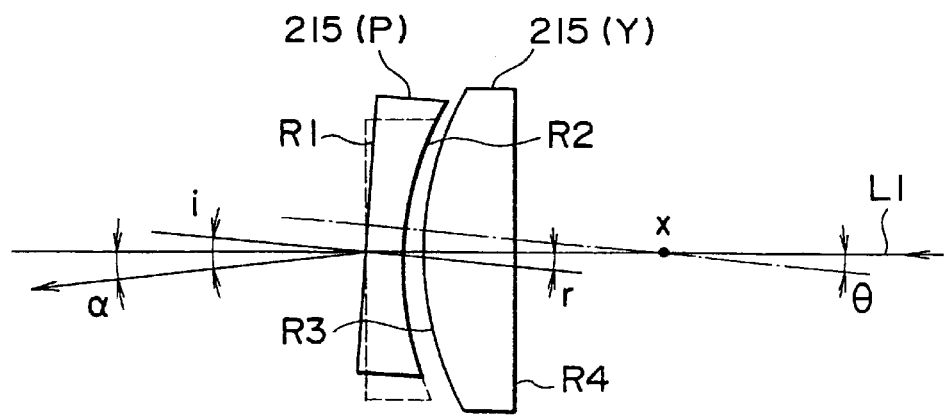
FIG. 21 is a sectional view for explaining the operation of the third embodiment.

Referring now to FIG. 21, an explanation will be given on the principle of changing the angle of the transmission optical axis in the vertical-angle variable prism. FIG. 20 is a sectional side view of the vertical-angle variable prism extracted from FIG. 19.

In a state where the concave curvature surface R2 of the plano-concave lens 215(P) is kept proximate to the convex curvature surface R3 of the plano-convex lens 215 (Y), if the plano-concave lens 215(P) is rotated by an angle θ in the pitching P-direction around the curvature center X of the concave curvature surface R2, then the plane R1 of the plano-concave lens 215(P) is inclined by an angle θ to the plane R4 of the plano-convex lens 215(Y), so that the vertical angle of the vertical-angle variable prism is varied to θ . Consequently, the shooting optical axis L1 of the incident light is transmitted with an angular displacement of α. FIG. 21 shows an example where the plano-concave lens 215(P) is rotated by an angle θ to the positive side in the pitching P-direction. In this case, the shooting optical axis L1 is rotated by an angle α to the negative side in the pitching P-direction.

In this example, the shake angle α of the shooting optical axis L1 (shake angle of the prism) is expressed as follows. Suppose now that n stands for the refractive index of the vertical-angle variable prism, i for the incidence angle (vertical outgoing refraction angle) of the light to the plane R1 of the plano-concave lens 215(P), and r for the refraction angle, respectively.

In this case, there exists the following relationship of Eq. (2) among the refractive index n, the incidence angle i and the refraction angle r.

$$\sin i = n \sin r \quad (2)$$

Since both of the incidence angle i and the refraction angle r are small, Eq. (2) may be expressed as Eq. (3).

$$i = nr \quad (3)$$

When the incidence angle of the light on the plane R4 of the plano-convex lens 215(Y) is orthogonal thereto, the refraction angle of the outgoing light is zero. Therefore, the refraction angle r of the light on the plane R1 of the plano-concave lens 215(P) becomes equal to the vertical angle θ of the vertical-angle variable prism. Consequently, Eq. (3) may be expressed as Eq. (4).

$$r = n\theta \quad (4)$$

It is further seen from FIG. 21 that the relationship of Eq. (5) is existent among the shake angle α, the incidence angle i and the refraction angle r.

$$\alpha = i - r \quad (5)$$

Rewriting Eq. (5) by the use of Eqs. (3) and (4), the shake angle α a may be expressed as Eq. (6) in relation to the vertical angle θ.

$$\alpha = n\theta - \theta = (n-1)\theta \quad (6)$$

If n =1.5 in the above equation, α=0.5 θ. Therefore, when the plano-concave lens 215(Y) is rotated by an angle θ, the angle of the outgoing optical axis is displaced by θ/2.

Any actual angular displacement of a video camera caused by a manual shake or the like is practically within ±1°, as described. Therefore, if the variation range of the vertical angle θ of the vertical-angle variable prism is set to ±2°, it is possible to change the angle of the outgoing optical axis by a maximum of θ=±1°, hence coping completely with any actual shake of the video camera.

In the third embodiment mentioned above, it is also possible to attain similar effects as in any of the foregoing embodiments.

Although the present invention has been described in detail with reference to some embodiments thereof, it is to be understood that the invention is not limited to such embodiments alone.

For example, the above embodiments represent a case where the present invention is applied to an optical image stabilizer which corrects a shake of a video camera by changing the angle of its transmission optical axis. However, the present invention is applicable also to an electrical image stabilizer which corrects a shake of a video camera by processing its video signal.

In the above description, each of the embodiments relates to an exemplary case of applying the present invention to a image stabilizer for a video camera. However, it is to be noted that the present invention is applicable to a image stabilizer for any other shooting system than a video camera. For example, the invention can be applied to a image stabilizer for an electronic still camera as well.

It is a matter of course that a variety of other changes and modifications of the present invention may be contrived within a scope not departing from the spirit thereof.

What is claimed is:

1. A shake discriminator comprising:
   a first shake detection means incorporated in a camera system to shoot a subject and serving to detect a shake of said camera system;
   a second shake detection means incorporated in said camera system and serving to detect a shake of a cameraman's face with regard to said camera system; and
   a shake discrimination means for making a discrimination, on the basis of the detection outputs of said first and second shake detection means, as to whether the shake of said camera system is the one intended by the cameraman.

2. A image stabilizer comprising:
   a first shake detection means incorporated in a camera system to shoot a subject and serving to detect a shake of said camera system;
   a second shake detection means incorporated in said camera system and serving to detect a shake of a cameraman's face with regard to said camera system;
   a shake discrimination means for making a discrimination, on the basis of the detection outputs of said first and second shake detection means, as to whether the shake of said camera system is the one intended by the cameraman; and
   an image stabilizing means for correcting the shake of said camera system in response to the output of said discrimination means signifying that the shake of said camera system is not the one intended by the cameraman, said shake correction means capable of holding the preceding corrected state when the output of said discrimination means signifies that the shake of said camera system is the intended one.

3. The image stabilizer according to claim 2, wherein said second shake detection means is disposed in a monitor means used by the cameraman for monitoring the shot image of said subject.

4. The image stabilizer according to claim 3, wherein said monitor means is a viewfinder, and said second shake detection means is disposed in an eyecup of said viewfinder.

5. The image stabilizer according to claim 4, wherein said second shake detection means consists of a plurality of pressure-sensitive elements spaced apart from one another at predetermined intervals around the axis of said eyecup.

6. The image stabilizer according to claim 5, wherein four of said pressure-sensitive elements are disposed at angular intervals of 90 degrees.

7. The image stabilizer according to claim 3, wherein said monitor means is a viewfinder; and said second shake detection means comprises an irradiation means provided in said viewfinder and serving to irradiate light to the cameraman's face, and a light-received position detection means provided in said viewfinder to receive the reflected light from the cameraman's face and further to detect the light-received position.

8. The image stabilizer according to claim 2, wherein, upon detection of the shake of said camera system by said first shake detection means, said shake discrimination means makes a discrimination that, if the shake of the cameraman's face to said camera system has not been detected by said second shake detection means, the shake of said camera system is the one intended by the cameraman, but if the shake of the cameraman's face has been detected, said shake discrimination means makes another discrimination that the shake of said camera system is not the intended one.

* * * * *